Jan. 1, 1963     M. V. FRIEDELL ET AL     3,071,209
LUBRICATING APPARATUS AND CONTROL VALVE
Filed Sept. 9, 1960     3 Sheets-Sheet 1

INVENTORS
MORLEY V. FRIEDELL
ALBERT W. DEWBERRY
BY
*Philip H. Sheridan*
ATTORNEY Jan. 1, 1963 M. V. FRIEDELL ET AL 3,071,209
LUBRICATING APPARATUS AND CONTROL VALVE
Filed Sept. 9, 1960 3 Sheets-Sheet 2

INVENTORS
MORLEY V. FRIEDELL
ALBERT W. DEWBERRY
BY
Philip H. Sheridan
ATTORNEY

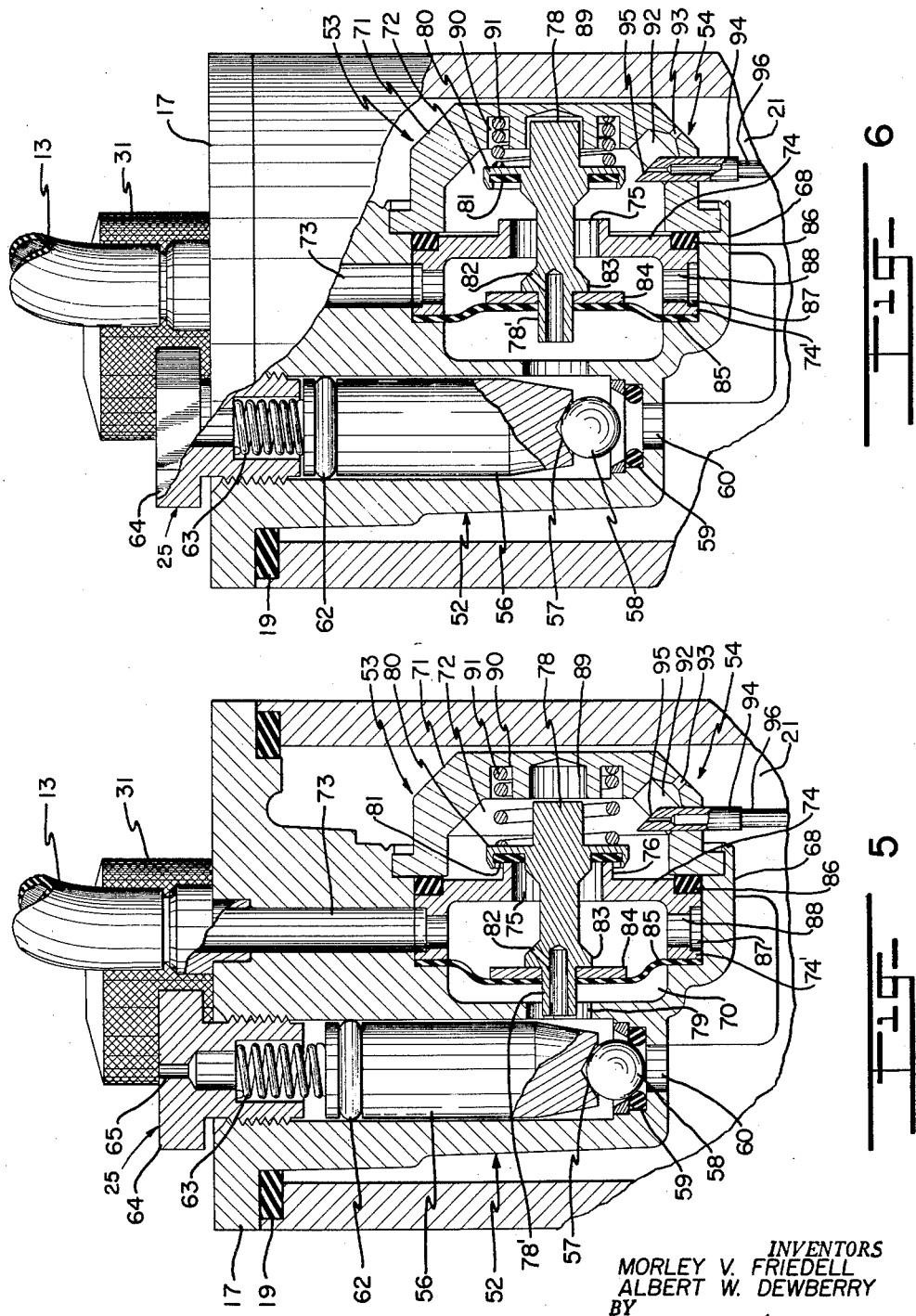

United States Patent Office 3,071,209
Patented Jan. 1, 1963

3,071,209
LUBRICATING APPARATUS AND CONTROL
VALVE
Morley V. Friedell, Wheat Ridge, and Albert W. Dewberry, Lakewood, Colo., assignors to C. A. Norgren Co., Englewood, Colo., a corporation of Colorado
Filed Sept. 9, 1960, Ser. No. 55,078
10 Claims. (Cl. 184—55)

This invention relates to a new and improved control valve system which is especially adapted for use in regulating the operation of a lubricating apparatus, and this invention also pertains to a self-contained lubricating apparatus which may be automatically controlled to deliver quantities of oil at desired intervals to machine parts and various mechanisms requiring lubrication, without requiring some external source for control and operation of the lubricating apparatus.

It is highly desirable to make provision in machines, such as machine tools, office machines or other small units for a lubricant system which may be incorporated into the machine for automatically controlled lubrication of the parts whenever required. Customarily, aerosol lubricators are employed in such applications and are able to deliver a lubricant fog mixture to the parts to be oiled provided that some suitable source of air pressure is available to generate the erosol and deliver it to the various points for lubrication. Nevertheless, it is extremely desirable to devise a lubricating apparatus, and especially one of the aerosol type, which is entirely self-contained; that is, which requires no external source of air pressure or timing mechanism; yet, which requires no constant manual adjustment or regulation but is essentially self-regulating and self-operating as an integral part of the machine with which it is associated. Moreover, it is important that such a unit be highly accurate over a relatively wide range of condtions so as to be at all times capable of supplying the lubrication requirements of the machine.

It is therefore a principal object of the present invention to make provision for a lubricating apparatus which is self-contained and self-regulating over a wide range of conditions for the supply, at desired intervals, of lubricant to the various parts of a machine, and wherein the lubricating apparatus is compact enough so as to be disposable inside the housing or enclosure of the machine, such as a cash register or office machine.

It is another object of this invention to provide for an aerosol lubricating apparatus which may be incorporated into, as an integral part thereof, a machine or mechanism, and which is generally capable of use in an area or location where compressed air is not available for operation of the aerosol generator; and moreover, to make provision for such a lubricating apparatus which will accurately meter out lubricant in direct proportion to the usage of the machine on which it is installed and is further conformable for use either with machines operating on intermittent, interrupted cycles or on continuous operation.

It is a further object of the present invention to provide for a control valve system particularly adaptable for use with a lubricating apparatus of the general character described which is responsive to variations in operating conditions of the apparatus over a wide range to cause accurate, periodic delivery of lubricant or other fluid from the apparatus.

It is a still further object to provide for pilot control means which are generally conformable for use in accurately controlling alternate opening and closing of associated means at different selective pressure level conditions; and more particularly wherein the pilot control means is adaptable for use with an aerosol lubricating apparatus to regulate delivery and shut-off of the lubricant supply under selected pressures for optimum mixing and delivery of a lubricant fog mixture or other fluid over desired time intervals.

It is an additional object of the present invention to provide for a control valve system adapted for use in an aerosol lubricating apparatus having a source of lubricant supply and confined air space wherein the control system is capable of regulating the delivery of lubricant under the influence of high-pressure conditions developed in the confined air space, and closing and shut-off of the lubricant in response to a predetermined pressure drop in the confined air space; furthermore, wherein the control is capable of being accurately and alternately opened and closed for the delivery of lubricant to a part or parts to be lubricated as required, notwithstanding variations in volume in the confined air space.

The above and other objects of the present invention will be made more apparent from the following description taken together with the accompanying drawings, in which.

FIG. 5 is a detailed sectional view showing a preferred form of control valve which is especially adaptable for use in the lubricating apparatus of the present invention and illustrating the relative disposition of parts in the closed position; and FIGURE 6 is another view, partially in section, of the control valve of the present invention illustrating the relative disposition of parts in the open position.

Figure 1:
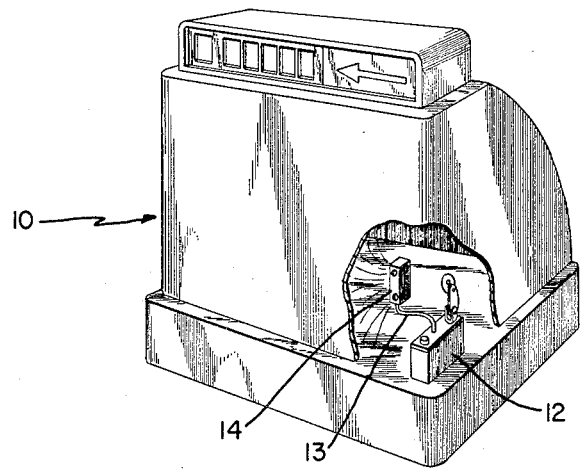
FIGURE 1 is a perspective view of a cash register with a portion thereof broken away to illustrate the disposition of a preferred form of lubricating apparatus installed within a typical machine, e.g., a cash register for the controlled delivery of lubricant to the various parts thereof.
Figure 2:
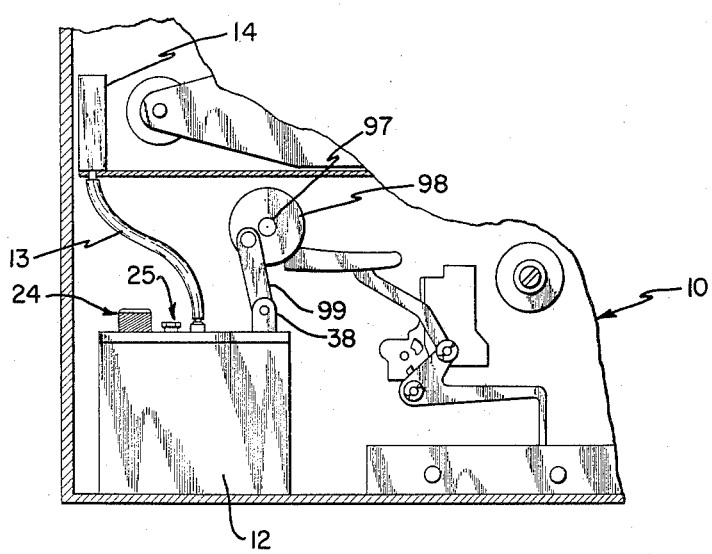
FIGURE 2 is a fragmentary, detailed view in section illustrating one method of developing the required air pressure for operation of an aerosol lubricating apparatus, in accordance with the present invention.
Figure 3:
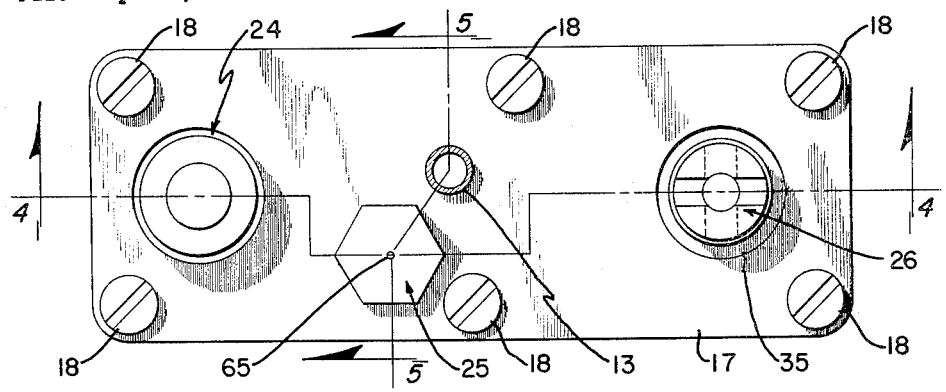
FIGURE 3 is a top view of the lubricating apparatus shown in FIGURES 1 and 2.
Figure 4:
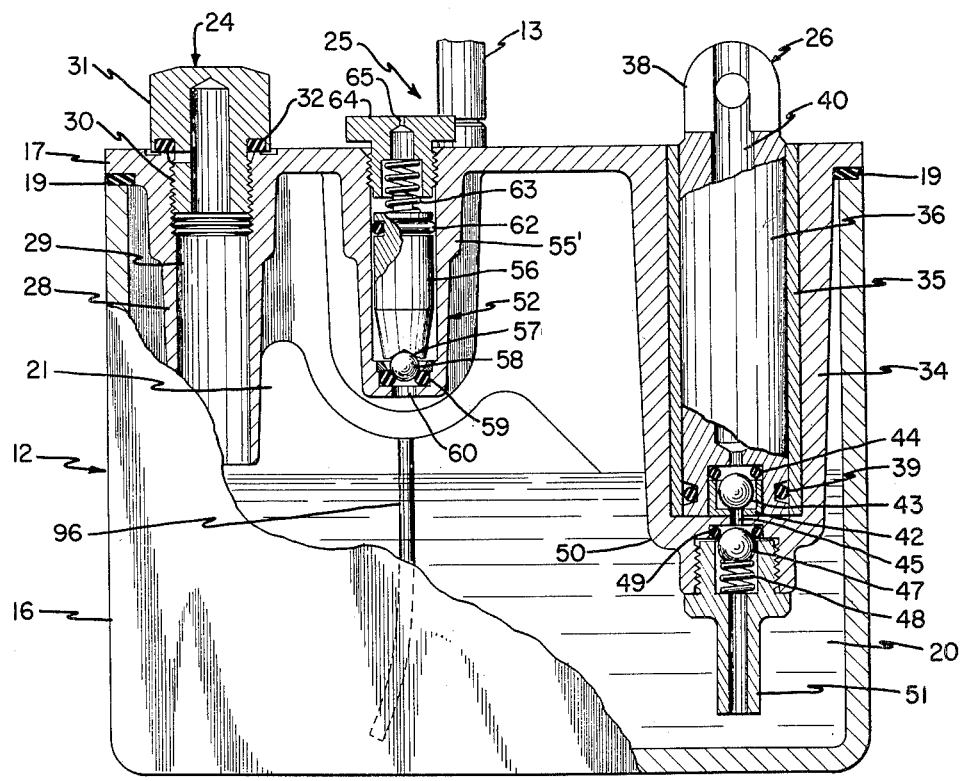
FIGURE 4 is a longitudinal view, partially in section of the aerosol lubricating apparatus, in accordance with the present invention.

Referring more particularly to the drawings, there is shown by way of illustrative example in FIGURES 1 and 2 a cash register 10, representative of any machine with which the lubricating apparatus of the present invention may be associated for the controlled delivery of lubricant to the various parts thereof. The cash register is particularly representative of many features of the present invention in that due to its size and the general location in which it is used, very little space is permitted within the cash register for installation of a lubricant system, accordingly requiring a very compact unit. Moreover it is generally used in an area where compressed air is not available, such as office buildings, stores, and the like. A lubricating apparatus 12, forming one important feature of the present invention, is illustrated as being mounted in one corner within the cash register and preferably the lubricating apparatus is employed to regulate the delivery of a lubricant fog mixture through a common discharge line 13 into a suitable manifold 14 for distribution to the various points requiring lubrication. As further illustrated in FIGURES 3 and 4, and in more detail, the lubricating apparatus 12 is comprised of a casing 16 and a cover 17 which are fastened together by screws 18 and sealed against leakage by a gasket 19. Generally, the casing 16 defines an enclosure for a source of lubricant 20 leaving a confined air space or air pocket 21 between the lubricant source and cover 17. The working elements for the apparatus generally consist of an oil filler opening 24, a control valve 25 and a pumping unit 26 all of which are disposed for extension through the cover 17 to operate together, in a manner to be described, as a common unit.

The oil filler opening 24 of course provides for access to the oil reservoir for filling to the desired level, and for this purpose the filler portion includes an extension tube 28 which projects downwardly from the cover body 17 to a predetermined distance in relation to the other parts and provides a central bore 29, interiorly threaded at the top thereof as at 30, for reception of a threaded plug 31 having a seal 32. In filling, the lower end of the extension tube is disposed to provide an air lock to prevent filling of the unit above the lower end of the extension tube 28 and thereby always leaves confined air space 21 for a purpose to be described.

The pumping unit 26 in turn has a downwardly projecting boss 34 which is bored out to receive a polished cylinder liner 35 through which piston 36 works in reciprocal fashion essentially for the purpose of increasing the air pressure in the confined air space 21. To this end, the piston 36 has a pivot bearing 38 at its upper end and is sealed at its lower end to the cylinder 35 by means of a sealing ring 39 positioned in an annular groove on the exterior of the piston. Extending centrally and vertically throughout the piston is an inlet bore 40 which communicates with the exterior of the unit and also continues at the lower end of the piston into oppositely-acting valves defined by a first inlet valve comprised of a cage 42, ball 43 and sealing ring 44, and at the lower end of boss 34 a second check valve which communicates through a reduced opening 45 with the inlet valve. The check valve is generally defined by ball 47 biased in an upward direction by spring 48 against a seal 49, and the entire unit is retained within a cage 50 formed at the lower end of the boss. The cage 50 in turn includes a threaded tubular extension 51 which projects downwardly to a point adjacent the bottom of the casing so as to insure a liquid seal for the pumping unit at all times.

Various means to be described may be employed to reciprocate the piston 36 through the cylinder 35, essentially to effect an incremental increase in air pressure in the confined air space 21, while of course the check valve seals the interior of the casing 16 from the outside at all times so as to maintain a differential in air pressure within the space. Thus, the pumping unit serves as a replacement for some external source of air pressure and most generally is designed to be of a type which will work off of the machine installation itself so as to operate the entire apparatus only when the machine is in operation. In any event, a constant source of air pressure which constantly varies over a relatively wide range is provided for operation of the aerosol generator to accomplish delivery of the desired amount of lubricant at desired intervals through the discharge line 13.

In order to regulate the output of lubricant fog from the lubricating apparatus and at the same time to closely control the intervals over which the fog will be delivered in accordance with the operation of the machine, such as the cash register 10, the control valves 25, as best seen from FIGURES 5 and 6, is made up essentially of a differential pilot valve 52, a discharge flow valve 53 which directly communicates with the discharge line 13, and an aerosol generator 54 which is formed as a unitary part of the discharge flow valve. For a broad understanding o fthe interrelationship between the various parts forming the control valve system, the entire unit is designed to control both the operation of the aerosol generator 54 and the delivery of the lubricant fog mixture produced thereby through the discharge line 13 for distribution to the various parts. Essentially, the control is made very sensitive to changes in pressure in the confined air space so as to accurately meter a supply of the lubricant for proper lubrication and this is regulated by controlling the opening of the valve for delivery of the lubricant upon a predetermined buildup in pressure in the confined air space, then to cause closing of the system as soon as the pressure has dropped a predetermined extent in the air space 21; therefore, for proper lubrication, opening and closing of the valve in response to differences in pressure must be accurately correlated with operating conditions of the machine. To accomplish this, the differential pilot valve 52 is comprised of a valve body 55 defining a cylindrical bore for slidable disposition of a valve piston 56. The piston 56 includes a generally concave seat 57 at its lower end, and a separate ball 58 is interposed between the concave seat 57 and a seal ring 59 positioned in a shoulder at the lower end of the body. In addition, a reduced bore 60 leads from the main bore, into the confined air space 21. At its upper end, the valve piston 56 includes a sealing ring 62 and the entire piston is biased in a downward direction by means of a compression spring 63, acting against the top surface of the piston, and which is seated within a threaded cap portion 64 mounted at the upper end of the cylindrical housing for the piston. It will be seen that the cap may be threadedly adjusted so as to control the compressional force of the spring against the piston and the cap further acts as a vented closure by means of a limited opening 65 to permit access to the entire valve unit whenever desired.

As will be noted from a comparison of FIGURES 5 and 6, the pressure in the confined air space will when the valve is in the closed position illustrated in FIGURE 5, act on the limited area of the ball 58 seated within the passage 60; however upon opening, as illustrated in FIGURE 6, the pressure will act across the increased area of the piston, which is several times that of the ball 58 in seated disposition. Accordingly, the initial pressure required in the confined air space to open the valve against the bias of the spring 63 will be considerably higher than that necessary to maintain the valve in the open position once unseated. In other words, the pilot valve is specifically designed to open under a relatively high pressure and to close against a relatively low pressure, and the pressure range between opening and closing may of course be dictated by the relative area between the piston and the valve seat formed at the ring 59.

The discharge valve 53 includes a valve body 68 forming a part of the main valve housing for the entire unit with a first valve chamber 70, and a generally cup-shaped portion 71 secured to the portion 68 to define a second chamber 72. Communicating with the first chamber 70 is a discharge passage 73 extending upwardly through the body of the housing into communication with the discharge line 13. Separating the chambers 70 and 72 is a centrally disposed valve cage 74 having an annular disc 74' with a central bore 75 and a rim 76 forming a seat for engagement with the end of valve piston 78 of the discharge valve assembly. The central bore 75 together with the chambers 70 and 72 essentially form a common passage for the supply of lubricant fog therethrough from the aerosol generator 54 into the discharge passage 73. In turn, the first chamber 70 is also provided with a bore 79 in one wall which communicates with the differential valve 52 so that in a manner to be described the operation of the discharge valve is responsive to opening and closing of the pilot valve.

Valve piston 78 is mounted within the valve body for horizontal extension throughout the common passage and includes an enlarged flange 80 which is headed on one side with a seating ring 81 of flexible material positioned for engagement with the valve seat 76. Additionally, the piston 78 includes an axial extension 78' of tubular configuration which projects into the bore 79 with a bleed vent 82 therein to establish constant communication between the common passage of the discharge valve and the differential pilot valve. Formed on the axial extension 78' is an enlarged shoulder 83 for disposition of a diaphragm support plate 84 having a diaphragm 85 mounted thereon. The valve cage 74 further includes a ring-like portion 74' which cooperates with the valve body to securely clamp the diaphragm 85 in place for extension across the chamber 70. Furthermore, a seal 86 is interposed between the valve cage and the body portion 71 which along with the seating ring 81 establishes sealed assembly of the cage within the valve body and sealed partitioning between the first and second chambers when the valve piston is in closed position. Additionally, the valve cage has a series of outlets 88 spaced around the ring-like portion 74' which communicate with an annular groove 87 in the valve body, and in turn the annular groove communicates with the discharge passage 73.

In order to bias the valve piston 78 to a closed position against the seat 76, the portion 71 includes a central counterbore 89 adapted to receive the end of the piston 78. An annular groove 90 surrounds the counterbore in spaced relation thereto for reception of a compression spring 91 which operates against the flange 80 to maintain the valve in a normally closed position while properly aligning it for extension throughout the common passage.

The aerosol generator 54 is shown disposed in the preferred form in communication with the chamber 72 of the discharge valve and essentially includes an inlet passage 92 formed in the wall of the portion 71 with an orifice 93 forming a continuation of the passage 92 for communication with the confined air space 21. The inlet passage 92 and orifice 93 are located essentially at 45 degrees to the axis of generator tube 94, and the tube projects vertically through the wall of the body portion 71 with tip 95 thereof disposed to be in exact alignment with the passage of air through the orifice 93. The generator tube further includes a capillary oil supply tube 96 which extends downwardly from the generator proper for suspension into the oil reservoir and preferably to the lowest point therein to provide a constant supply of lubricant to the generator tube. The lubricant is drawn off at the pickoff face or tip 95 of the tube by the passage of air under pressure through the orifice so as to disburse the lubricant into minute, finely divided particles, or an aerosol for delivery through the discharge valve. This operation is described in more detail in co-pending application, Serial No. 719,608 filed March 6, 1958, and now Patent No. 2,966,312 entitled "Aerosol Generator and Lubricator and Method of Generating Micronic Size Aerosol."

Having thus described the construction in detail of a preferred form of lubricating apparatus, and particularly the control valve employed therein, the relative disposition and function of the parts will be more readily seen from the foregoing description of a typical operation of the unit. Again referring to FIGURES 1 and 2, to cause desired reciprocation of the pumping unit 26, the lubricating apparatus should be mounted within the cash register, for example, at a place convenient to a rotating or oscillating part, such as a shaft 97 which may rotate once for each cycle of the machine. Connected to the shaft 97 is a crank 98 which is in turn connected by means of a link 99 to the pivot bearing 38 of the pumping unit. As an alternative, other suitable means may be employed to impart the desired reciprocation to the pumping unit, such as, a cam with spring return of the piston or by direct connection to some other reciprocating part of the machine and in any event it is generally desirable to make the pumping unit directly responsive in operation to that of the machine, particularly in machines having intermittent operation so that the lubricating apparatus will only operate to deliver lubricant at selected intervals in accordance with the operation of the machine itself.

For the purpose of illustration, in the cash register 10, each cycle of the machine will operate the pumping unit, causing a small amount of air to be compressed in the confined air space so as to gradually increase the pressure therein. In this connection, the oil pressure in the aerosol generator remains in balance with that in the confined air space since the entire area is under pressure. When the pressure has built up to a predetermined point, the pilot valve may be controlled to open by the pressure acting against the ball 58 overcoming the force of the spring 63 to move the piston 56 toward open position as illustrated in FIGURE 6. At this point, the air in the confined air space will rush into the pilot valve so as to immediately act upon the increased area of the piston 56 and will simultaneously exert pressure on the diaphragm 85 acting against the bias of the spring 91. The pressure level necessary to open the pilot valve will of course be greater than that necessary to cause opening of the discharge valve against the bias of the spring 91 and once this occurs the entire common passage of the discharge valve will open to induce the air from the confined air space to pass through the orifice 93 across the tip of the aerosol generator while the oil is also being forced up the capillary tube to the tip. The aerosol thus created at the tip of the generator in a manner described in more detail in the above-mentioned patent, will pass through the common passage including the central bore 75, the discharge passage 73 and the discharge line 13 to the manifold 14 for distribution to the various parts. If desired, suitable means such as reclassifiers, not shown, may be employed in the various distribution lines to convert the aerosol into liquid oil and to deposit it on the parts to be lubricated; otherwise the aerosol may remain in the form of a spray for lubricationn of the various parts. As the air is exhausted from the air space, notwithstanding continued operation of the pumping unit, there will be a continuous drop in pressure therein. However, due to the large area of the piston 56 of the pilot valve, relative to the valve area of the ball 58, the control valve will remain open and the discharge of air continue until spring 63 overcomes the pressure exerted on the pilot valve piston. Thus, the units are designed so that as long as the pilot valve remains open the air pressure acting upon the diaphragm 85 will be enough to overcome the force of the compression spring 91, and opening and closing of the discharge valve will be governed completely by the pilot valve.

The ratio of areas in the pilot valve of the piston and ball when positioned on the seat may be dictated in accordance with design requirements of the unit and its desired application. As an illustration, a ratio of 5 to 1 between the two areas may provide an opening or discharge pressure level of 40 p.s.i. and a closing level of 8 p.s.i. Then, as soon as the pilot valve closes, any air remaining between the pilot valve and diaphragm will gradually pass through the bleed vent 82 so as to relieve the pressure on diaphragm 45 to permit the discharge valve to close and to prevent any further discharge of lubricant from the discharge valve until cycling of the machine has again built up the air pressure in the confined air space to the appointed level. Preferably, the closing pressure level is established at a sufficient pressure so that the air that remains in the confined air space will initiate the next pressure buildup, and is not wasted, which would be the case if the air were all exhausted. For example, the closing level may be established at some point just about 5 p.s.i. with an opening level of 35 to 40 p.s.i. so that sufficient pressure is available at all times upon opening for generation of the aerosol to completely fill the discharge line and to deposit the fog at the point of usage.

It is to be observed that, as the oil from the lubricant source is consumed in operation of the apparatus, the volume of the confined air space will continually increase. Since the apparatus operates under a certain pressure differential, and further will open only by raising the pressure to a certain predetermined level, the number of strokes applied to the pumping unit to gradually increase the pressure level will increase in accordance with the increase in volume of the confined air space. Thus, with a full supply of oil, perhaps 100 strokes may be required; then, as the lubricant reservoir level lowers and the volume of the air space increases, additional strokes are needed to raise the pressure in the space. Nevertheless, under the design of the control valve as described, the discharge time made available for delivery of the lubricant to the system will also lengthen due to greater volume of the air space, and the average amount of oil deposited will remain virtually constant. In other words, the time required to build up the air space to the desired level will be accompanied by an increase in delivery time. In other respects, the quantity and time of delivery of the lubricant may be closely regulated through proportioning of the various elements in the control valve, particularly, the size of the orifice 93, and through variations in relative piston size to volume, length of stroke of the pumping unit, etc.

It is recognized that broadly it is known to provide for the delivery of lubricant either in liquid or aerosol form to various parts of the machine to be lubricated, and at desired, automatically-controlled intervals. At the same time, the manner in which the control valve of the present invention performs this function, especially to accurately meter the lubricant and to control delivery time in accordance with variations in volume in the confined air space is considered to be novel. In this relation, the particular control exerted by the pilot valve on the discharge valve for the delivery of aerosol through the discharge line secures a notably improved system which will insure that the required amount of lubricant will be supplied to the parts. Apart from this, it is considered that the control valve in itself would have many other potential applications, e.g., a relief valve with accurately controlled blow-down, or as a timing device to discharge an air or gas cylinder at predetermined intervals. Thus, notwithstanding the unique application of the control valve to a lubricating apparatus in the manner described, it is capable of imposing similar accurate controls on systems other than an aerosol generator and in this connection its association with an aerosol generator is given for the purpose of illustrating a preferred form only.

It is therefore to be understood from the foregoing that various modifications and changes may be made in the elements comprising the lubricating apparatus and the control valve employed therewith without departing from the scope of the present invention, as defined by the appended claims.

What is claimed is:

1. In a lubricator adaptable for supplying controlled quantities of lubricant to a machine and the like, the combination, with an enclosure partially filled with lubricant to leave an upper confined air space including means to incrementally increase the pressure in the air space and a lubricant generator, of a discharge valve having a valve member movable through a passage with a valve seat extending across the passage, the passage communicating on one side of said seat with the lubricant generator and on the opposite side with a discharge line, said valve member being biased to a closed position against said seat to normally interrupt communication between the generator and said discharge line, and pilot valve means responsive to variations in pressure in the confined air space to control opening and closing of said discharge valve including a first portion of limited effective area movable under a high pressure in the confined air space to cause unseating of the discharge valve member for communication between the generator and the discharge line and a second portion of a relatively large effective area movable to a closed position against a relatively low pressure in the confined air space to permit said discharge valve member to return to the closed position against the valve seat.

2. In a lubricator adaptable for use in supplying controlled quantities of lubricant to a machine and the like at periodic intervals, the combination, with a sealed enclosure partially filled with lubricant to leave an upper confined air space including means to incrementally increase the pressure in the air space and a lubricant generator, of a discharge valve having a valve member movable through a passage with a valve seat extending across the passage, the passage communicating on one side of said seat with the lubricant generator and on the opposite side with a discharge line, said valve member being biased to a closed position against said seat to normally interrupt communication between the generator and said discharge line; and pilot means responsive to variations in pressure in the confined air space to control opening and closing of said discharge valve including a pair of stepped concentric openings of different diameter with the smaller of the openings leading into the confined air space, a pilot valve member disposed in the larger opening and being normally seated across the smaller opening to be movable under a relatively high pressure in the confined air space to cause unseating of the discharge valve member for communication between the generator and the discharge line whereupon the pressure in the confined air space acts across the area of the larger opening and said pilot valve member is movable to a closed position only against a relatively low pressure in the confined air space to permit said discharge valve member to return to a closed position against the valve seat.

3. In a lubricator according to claim 2 in which said pilot valve member is characterized by a piston in the larger opening with a generally spherical member at one end thereof for seating in closed relation across the smaller bore.

4. In a lubricator according to claim 3 in which said pilot valve member further includes biasing means at the end opposite said spherical member to bias said pilot valve member to the normally closed position, and means mounting said pilot valve member in adjustable relation to provide for selective regulation of the bias of said pilot valve member in the closed position.

5. In a lubricator adaptable for use in supplying controlled quantities of a lubricant fog to a machine and the like at periodic intervals, the combination with a common enclosure partially filled with lubricant to leave an upper confined air space including means in the enclosure to incrementally increase the pressure in the air space and a lubricant fog generator having a lubricant supply tube and an air inlet, of a discharge valve in the enclosure having a valve piston movable through a common passage with a valve seat extending across the passage, the passage communicating on one side of said seat with the lubricant generator and on the opposite side with a discharge line, said valve member being biased to a closed position against said seat to normally interrupt communication between the generator and said discharge line, and pilot means responsive to variations in pressure in the confined air space to control opening and closing of said discharge valve including a pair of stepped concentric bores formed with a valve seat therebetween and the smaller bore being in constant communication with the confined air space, a pilot valve member slidably disposed in the larger bore and being biased into normally closed relation against the valve seat, said pilot valve member being movable under a relatively high pressure in the confined air space to open said discharge valve member with the pressure in the air space acting across the area of the larger bore, said pilot valve member being further movable to the closed position under a relatively low pressure in the confined air space to permit said discharge valve member to return to a closed position against its valve seat.

6. A self-contained lubricator adapted for use as a controlled source of lubricant supply in a mechanism, comprising an enclosure containing a source of lubricant partially filling said enclosure to leave an upper confined air space, a discharge valve including an air discharge passage and an air inlet passage, the latter communicting with the confined space and with a common pssage interposed between the discharge and inlet passages, and a valve member biased to normally interrupt communiction between the inlet and discharge passages for the flow of air from the inlet through the discharge passage, a lubricant supply source communicating with the reservoir and disposed to deliver lubricant in response to the flow of air from the confined air space through the inlet passage when the valve member is open, and means extending into the air space operative to apply an incremental increase in pressure in the confined air space to open said valve member for the periodic discharge of the air-lubricant mixture through the discharge passage.

7. A self-contained lubricator adapted for use as a controlled source of lubricant supply in a machine and the like, comprising an enclosure containing a source of lubricant partially filling said enclosure containing a source of lubricant partially filling said enclosure to leave an upper confined air space, a discharge valve including an air discharge passage, an air inlet passage and a common passage interposed therebetween, the air inlet passage communicating with the confined space, a valve seat in the common passage and a valve member biased to normally interrupt communication between the inlet and discharge passages with means on the valve member being responsive to a selected air pressure in the confined air space to open said valve member, a lubricant supply source communicating with the reservoir and disposed to deliver lubricant in response to the flow of air from the confined air space through the inlet passage, and means extending into the air space being operative in response to operation of the machine to apply an incremental increase in pressure in the confined air space for the periodic discharge of an air-lubricant mixture through the discharge passage.

8. A self-contained lubricator according to claim 7 in which the means for applying an incremental increase in pressure in the air space includes a reciprocal piston, a first valve to introduce air into the confined space and a second valve to maintain the pressure level in the air space.

9. A self-contained lubricator adapted for use as a controlled source of lubricant supply in a machine and the like, comprising an enclosure containing a source of lubricant partially filling said enclosure to leave an upper confined air space, a discharge valve including a discharge passage and an inlet passage, the latter communicating with the confined space and with a common passage interposed between the discharge and inlet passage, a valve member biased to normally interrupt communication between the inlet and discharge passage, pilot means operative in response to a selective increase in pressure in the confined air space to exert a corresponding pressure against said valve member and to open the common passage for communication between the inlet and discharge passages under a pressure, a lubricant supply source communicating with the inlet passage and disposed to deliver lubricant with air flowing from the confined air space through the inlet passage when the valve member is open, and means extending into the air space operative in response to operation of the machine to apply an incremental increase in pressure in the confined air space to cause opening of said valve member for the periodic removal of the air-lubricant mixture through the discharge passage.

10. A pilot-operated control valve for selective opening under a relatively high pressure and selective closing under a relatively low pressure comprising a discharge valve seat disposed across a common passage communicating on one side with an inlet passage and on the opposite side with a discharge passage and a pilot valve passage, a valve member movable through the common passage being biased into normally closed relation against the discharge valve seat with a valve extension having a flexible diaphragm positioned to interrupt communication between the pilot valve passage and discharge passage, and a pilot valve member movable in a chamber communicating with the pilot valve passage, a pilot valve seat stationed in the chamber and means biasing said pilot valve member into closed relation with the pilot valve seat, said pilot valve member being movable to an open position under a relatively high pressure to provide for introduction of the pressure against the diaphragm to cause opening of the valve member for communication between the inlet passage and discharge passage, and the pilot valve member being further movable to a closed position against a relatively low pressure, and with a limited opening in the diaphragm portion to establish equalization in pressure on opposite sides of said diaphragm for return of the dicharge valve member to a closed position.

References Cited in the file of this patent
UNITED STATES PATENTS

| | | |
|---|---|---|
| 646,417 | Dixon | Apr. 3, 1900 |
| 688,261 | Parks | Dec. 3, 1901 |
| 723,118 | Zindel | Mar. 17, 1903 |
| 784,408 | Krich Baum | Mar. 7, 1905 |
| 2,821,996 | Stevenson | Feb. 4, 1958 |
| 2,887,181 | Dillon | May 19, 1959 |
| 2,966,312 | Wilson | Dec. 27, 1960 |